(12) United States Patent
Lildholdt et al.

(10) Patent No.: US 9,777,860 B2
(45) Date of Patent: Oct. 3, 2017

(54) VALVE HOUSING WITH COLLARED SPINDLE GUIDE

(71) Applicant: Broen A/S, Assens (DK)

(72) Inventors: Mads Lindegaard Lildholdt, Haarby (DK); Karin Birthe Lindegaard Lildholdt, Haarby (DK); Peder Madsen, Odense (DK)

(73) Assignee: BROEN A/S, Assens (DK)

( * ) Notice: Subject to any disclaimer, the term of this patent is extended or adjusted under 35 U.S.C. 154(b) by 64 days.

(21) Appl. No.: 14/421,500

(22) PCT Filed: Aug. 13, 2013

(86) PCT No.: PCT/DK2013/050263
§ 371 (c)(1),
(2) Date: Feb. 13, 2015

(87) PCT Pub. No.: WO2014/026691
PCT Pub. Date: Feb. 20, 2014

(65) Prior Publication Data
US 2015/0219235 A1    Aug. 6, 2015

(30) Foreign Application Priority Data
Aug. 13, 2012 (DK) .................................. 2012 70474

(51) Int. Cl.
*F16K 27/06* (2006.01)
*F16K 5/06* (2006.01)
*F16K 5/00* (2006.01)

(52) U.S. Cl.
CPC .............. *F16K 27/067* (2013.01); *F16K 5/06* (2013.01); *F16K 5/00* (2013.01); *F16K 27/06* (2013.01);
(Continued)

(58) Field of Classification Search
CPC ........ F16K 27/00; F16K 27/06; F16K 27/067; F16K 5/00; F16K 5/06; F16K 5/0647;
(Continued)

(56) References Cited

U.S. PATENT DOCUMENTS 3,490,734 A    1/1970   Freeman
4,546,790 A    10/1985   Huber et al.
(Continued)

FOREIGN PATENT DOCUMENTS

CH    EP 0077058 A1 *   4/1983    ........... F16K 27/067
CN    1313937 A    9/2001
(Continued)

*Primary Examiner* — Mary McManmon
*Assistant Examiner* — Hailey K Do
(74) *Attorney, Agent, or Firm* — David S. Safran

(57) ABSTRACT

A valve and method for producing a valve for regulating a fluid, the valve including a valve housing with a central part and two connection ends, the connection ends extending away from the central part. Internally of the central part, there is arranged a valve body with a through-going aperture that is arranged in a valve seat and connected to a valve spindle, the valve spindle being arranged in a spindle guide stub on the valve housing. The valve housing is made from a plastically deformed tubular item and includes a collared spindle guide stub with at least one projection, the projection or projections extending in continuation of the spindle guide stub. This projection can be used as a lock ensuring that the valve spindle is retained in its intended position, and at the same time, such projections can form stops at the extreme positions of the valve body.

10 Claims, 4 Drawing Sheets

(52) U.S. Cl.
CPC .... *Y10T 29/49405* (2015.01); *Y10T 137/0402* (2015.04); *Y10T 137/0491* (2015.04); *Y10T 137/0508* (2015.04)

(58) Field of Classification Search
CPC .... F16K 5/0694; F16K 5/0442; F16K 5/0485; F16K 5/0242; F16K 5/0285; F16K 41/043; F16K 27/062; F16K 27/065; Y10T 137/0402; Y10T 137/0491; Y10T 137/0508
USPC ...... 251/366, 315.1, 315.13, 315.14, 315.15, 251/286–288; 137/315.18, 315.19, 15.22; 29/890.124, 890.12, 890.126, 890.13
See application file for complete search history.

(56) References Cited

U.S. PATENT DOCUMENTS

| | | | |
|---|---|---|---|
| 5,076,542 A | | 12/1991 | Ottens et al. |
| 5,673,896 A | | 10/1997 | Gillen |
| 6,425,571 B1 | * | 7/2002 | Schadewald .......... F16K 27/067 251/286 |
| 6,431,520 B1 | * | 8/2002 | Ferrer Beltran ...... F16K 5/0636 251/288 |
| 6,916,011 B2 | * | 7/2005 | Kitazawa .............. F16K 27/067 137/15.22 |

FOREIGN PATENT DOCUMENTS

| | | | |
|---|---|---|---|
| CN | 201982790 U | 9/2011 | |
| DE | 3905241 C1 * | 10/1990 | .......... F16K 5/0663 |
| EP | 1 052 439 A1 | 11/2000 | |
| RU | 2 136 998 C1 | 9/1999 | |
| RU | 2 193 130 C2 | 11/2001 | |

\* cited by examiner

VALVE HOUSING WITH COLLARED SPINDLE GUIDE

BACKGROUND OF THE INVENTION

Field of the Invention

The present invention concerns a method for producing a valve for regulating a fluid, the valve including a valve housing with a central part and with two connection ends, the connection ends extending away from the central part, wherein there is arranged a valve body internally of the central part, for example, with a through-going aperture, arranged in a valve seat and connected to a valve spindle, the valve spindle arranged in a spindle guide stub on the valve housing, wherein the valve housing is at least partly constituted by a plastically deformed item, and wherein the method of producing the valve housing with spindle guide stub at least includes the following steps:

providing a tubular item;
providing a cutout with an internal edge on the tubular item;
providing a plastic deformation in the form of a collar through the cutout, whereby a spindle guide stub is formed.

The invention further concerns a valve for regulating a fluid, the valve including a valve housing with a central part and with two connection ends, the connection ends extending away from the central part, wherein internally of the central part there is arranged a valve body, for example, with a through-going aperture, wherein the valve body is arranged in a valve seat and connected to a valve spindle, the valve spindle arranged in a spindle guide stub on the valve housing, wherein the valve housing is made from a plastically deformed tubular item and includes a collared spindle guide stub.

Description of Related Art

It is commonly known to make valves, e.g., ball valves, and thereby valve housings of several parts and then assemble these parts around a valve seat and a valve body. Such valves are typically made of brass or other copper-based alloy and are typically assembled by corresponding screw threads in respective parts, or alternatively, by means of bolts.

When speaking of a ball valve, the valve body is, as indicated by the name, spherical and with an outer size which is greater than the connecting openings in the valve housing. Such a valve therefore has a valve housing with a geometry in which valve seat and valve body are disposed. The valve housing is typically joined in the vicinity of the valve body as the latter require the largest internal dimension. Such valves are typically made of cast items which are shaped by machining to the desired geometry. This shaping process is, however, rather cost-intensive for several reasons. The individual work pieces are to be cast, handled and machined one by one in a metal cutting unit. Since the work pieces are individually machined, the process is time-consuming, irrespective of the application of modern and rapid processes.

In addition to the handling and machining of the cast work pieces prior to assembling around a valve seat and a valve body, the cost of the material also plays a significant role. Brass or other suitable alloys are expensive and imply an appreciably greater cost than e.g., common weldable carbon steel.

Thus, there is an expressed desire for making valves for heating and cooling systems, for potable water and for other purposes in steel, e.g., carbon steel or stainless steel which is cheaper and which can be worked with modern production equipment directly from a plate piece or a tube piece faster and cheaper than possible when casting and machining work pieces of brass.

At the same time, it is greatly desired to entirely avoid performing welding processes on a valve as such processes cause the work pieces to be set up at least one more time and that a welding process is to be performed, which of course raises the cost of the product.

U.S. Pat. No. 4,546,790 discloses a valve for regulating a fluid in which the valve housing itself includes a central part and two connection ends which extend away from the central part. Internally of the central part there is arranged a valve body in a valve seat, the valve body connected to a valve spindle. The valve spindle is arranged in a spindle guide stub collared on the valve housing. According to U.S. Pat. No. 4,546,790, a spindle guide stub is collared, but there is no indication that the end of the spindle guide stub achieves its final shape after collaring and thus is not to be worked or machined any more, something which quite common. Besides, the spindle guide stub indicated in U.S. Pat. No. 4,546,790 has the drawback that it neither has any kind of contact faces that may serve as stop for the movement of the operating handle nor includes means that lock or retain the valve spindle in axial direction. The absence of a contact face acting as a stop is less important in some cases as by certain types of valves it can be felt whether the valve body is in open or closed position. By ball valves, however, it is impossible to feel the position as in principle they can be rotated indefinitely. Therefore, it is necessary to integrate a kind of contact face on the valve such that the position of the valve body in the valve housing can be known with certainty. By the solution according to U.S. Pat. No. 4,546,790, it is only possible to determine the movement of the valve body in that after formation of a plastically deformed spindle guide stub, such a contact face/stop is retrofitted, typically provided by welding or some kind of machining. Also, some kind of securing of the valve spindle in axial direction is to be provided. These process steps are unwanted because of e.g., the action of heat and not the least the costs associated with respective handling and machining processes.

U.S. Pat. No. 6,916,011 B2 discloses a ball valve comprising a body having at a central position a seat-producing part formed with a stem-inserting hole with a cutout having an edge with a shape such that the edge on the cutout after collaring faces inward and towards the central part of the valve housing. The cutout which faces inwardly towards the central part of the valve housing necessitates a larger valve housing and the risk of damaging O-rings when assembling the stem from inside the valve.

SUMMARY OF THE INVENTION

It is the object of the invention to indicate a solution to the above problem wherein a valve housing is made of a tubular item, wherein a minimum number of chip removing and cutting processes are performed before mounting a valve seat and a valve body, which mounting is performed before final shaping of the valve housing itself.

As mentioned in the introduction, the invention concerns a method for producing a valve for regulating a fluid, the valve including a valve housing with a central part and with two connection ends, the connection ends extending away from the central part, wherein internally of the central part there is arranged a valve body, for example, with a through-going aperture, arranged in a valve seat and connected to a valve spindle, the valve spindle arranged in a spindle guide stub on the valve housing, wherein the valve housing is at least partly constituted by a plastically deformed item, and wherein the method of producing the valve housing with spindle guide stub at least includes the following steps:

provliding a tubular item;

providing a cutout with an internal edge on the tubular item;

providing a plastic deformation in the form of a collar through the cutout, whereby a spindle guide stub is formed.

The new features of a valve according to the invention are that the cutout has an edge with a shape such that the edge on the cutout after collaring is facing away from the central part of the valve housing, thus forming the end of the spindle guide stub; and that the cutout includes at least one projection, the projection extending into the cutout prior to the plastic deformation.

Such a cutout can, for example, be a generally oval cutout with rounded end faces and straight side faces, where at least one side face is entirely or partly constituted by, e.g., one or more rectangular or triangular projections, or alternatively, by one or more projections with a completely different shape where the projection extends towards the opposing side face of the cutout. The inwardly facing face in the cutout forms the finished contour on the edge of a spindle guide stub, also called a spindle guide. Such a cutout can advantageously be formed by cutting action, e.g., laser cutting or stamping. In one or more subsequent process steps, one or more mandrels are pulled/drawn up through the formed cutout, eventually forming the finished upwardly facing edge of the spindle guide stub itself. In other words, there is applied a deformation substantially corresponding to deforming the inwardly facing surface so as to face upwards—a turning/deformation of 90°. After ending deformation, the upwardly facing edge is the finished edge, and due to the well-chosen original shape it is not necessary to perform any working or machining of the upwardly facing surface or edge.

A method for producing a valve according to the invention may include that the tubular item is provided by deep drawing or a corresponding process where, e.g., a plate piece is worked by deformation into having a more or less tubular shape.

Alternatively, a method for producing a valve according to the invention can be so that the tubular item is provided by shortening a prefabricated tube piece with the desired dimensions.

Depending on material properties and the most advantageous production methods with regard to cost as well as with regard to tolerances or surface quality, there is a free choice between the said methods which each have their own specific advantages.

Common to the said methods is that hereby can be produced a valve housing which is only constituted by a single item formed in one piece without any kind of joining by welding, bolting or similar joining methods.

A method for producing a valve according to the invention can include that the valve spindle is mounted from the outer side of the valve housing and down through the collared spindle guide stub. It is very common to mount the valve spindle from the external side, providing that thick as well as long valve spindles can be used without causing any problems. A valve spindle is just placed the spindle guide stub and brought to engage a valve body which is arranged in the central part of the valve housing.

Another possible method for producing a valve according to the invention is that the valve spindle is mounted from the internal side of the valve housing and up through the collared spindle guide stub.

Irrespective of which method is applied for mounting the valve spindle, a method for producing a valve according to the invention may include that the valve spindle is fixed in the spindle guide stub by engaging one or more projections at the end of the spindle guide stub whereby the projection or projections are brought to engage a recess or a cutout on the valve spindle. In this way, the projections formed at the end of the spindle guide stub are used as a kind of lock cams that keep the valve spindle in correct position. Actually, the mentioned projections can either be deformed to engage a recess or cutout or they can be in resilient engagement such that in principle they are preloaded, and when the valve spindle is put in place in the spindle guide stub, the projection or projections click into position in a corresponding recess or cutout. Such a recess or cutout can be made in various ways and may include a surface which, e.g., at one or two extreme positions, comes in contact with one or more of the projections. Hereby is achieved that the valve spindle and thereby the valve body cannot be turned any farther. This can advantageously be applied by fully closed and by fully open valve.

In a variant of a method for producing a valve according to the invention, the valve body in the valve housing can be placed in an open position after which the valve is finished by electroplating. This is a very rapid and suitable form of finishing as optimal protection against corrosion is achieved on the internal surfaces as well as on the external surfaces. By positioning the valve body in the open position, the external surface of the valve body, which typically is spherical and coated with chromium or other kind of coating, against coating with zinc as the external surfaces in contact with the valve seat are hidden in the valve seat. In addition, the electroplating does not leave any appreciable coating on the chrome-plated surfaces as the adhesion hereon is very small. By a method according to the invention it is thus possible to achieve an optimised production and assembling process for a valve, and furthermore to perform an optimal surface coating after assembling the valve.

By this method, the valve can be made of, e.g., untreated steel in a series of contiguous and automated processes, and after mounting the production can end with a surface finishing. Such a valve and method for producing a valve is very advantageous as the process is simple, takes place in a straightforward sequence and is completed with finishing of the surface.

In a preferred variant of the invention, the valve housing can advantageously be made of, e.g., a carbon steel which already has been applied a surface coating of zinc or other suitable coating. For example, a steel tube galvanized by a suitable galvanizing process can be used. Hereby is achieved the obvious advantage that the surface treatment is performed before working the valve housing into its final geometric shape, entailing a lower production cost of the finished product.

As mentioned, the invention further concerns a valve for regulating a fluid, the valve including a valve housing with a central part and with two connection ends, the connection ends extending away from the central part, wherein internally of the central part there is arranged a valve body, for example, with a through-going aperture, wherein the valve body is arranged in a valve seat and connected to a valve spindle, the valve spindle arranged in a spindle guide stub on the valve housing, wherein the valve housing is made from a plastically deformed tubular item and includes a collared spindle guide stub.

The new feature of such a valve is that the spindle guide stub includes at least one projection where the projection or projections extend in continuation of the spindle guide stub. As mentioned above, this projection can be used as lock which ensures that the valve spindle is retained in its intended position, and at the same time that one or more such projections can form abutments/stops for means on either the valve spindle or on a handle in connection with the valve spindle such that, e.g., the extreme positions of a valve body are established by these means.

In an embodiment of a valve including valve housing according to the invention, the valve housing may advantageously include a further collared stub for mounting a sensor. Such a sensor can, e.g., be a temperature sensor, a pressure sensor or another kind of sensor.

As mentioned, a valve including a valve housing according to the invention can include that the at least one projection includes at least one contact face arranged for contact with one or more corresponding contact faces arranged for the purpose in connection with an operating handle for the valve.

A valve including a valve housing according to the invention is typically designed such that the connection ends have an inner diameter which substantially corresponds to the inner diameter of the valve body. This is therefore a so-called full-flow valve which advantageously can be used in many places where there is a need for a more unhindered flow in the medium flowing through the valve. The connection ends on the valve housing can be designed according to need and can be with male ends or female ends and include all thinkable types of couplings for connecting pipes or hoses, including couplings of the press-fit type.

At the time being, thin-walled materials gain a foothold in the industry and are increasingly applied to industrial solutions as well as to plumbing installations in residential buildings. There are innumerable advantages connected with thin-walled pipes and fittings, and the jointing methods are very simple, why time-consuming and cost-raising work of threading, welding or soldering is avoided.

A valve housing according to the invention can advantageously be made of thin-walled material, such as untreated or surface treated carbon steel or stainless steel, where the valve housing is formed by plastic deformation of the material, e.g., by hydraulic shaping or by axial shaping or by another suitable process. Particularly hydraulic shaping and axial shaping have appeared to be very well suited for making a valve housing as such processes are rapid and cheap compared with traditional production methods for valve housings, which are typically made of sintered, cast or forged brass or other suitable material which is machined afterwards and fitted with a valve insert. Furthermore, hydraulic shaping and axial shaping are very accurate shaping methods and good tolerances can be attained.

The invention is described in the following with reference to the accompanying drawings.

DETAILED DESCRIPTION OF THE INVENTION

Figure 1:
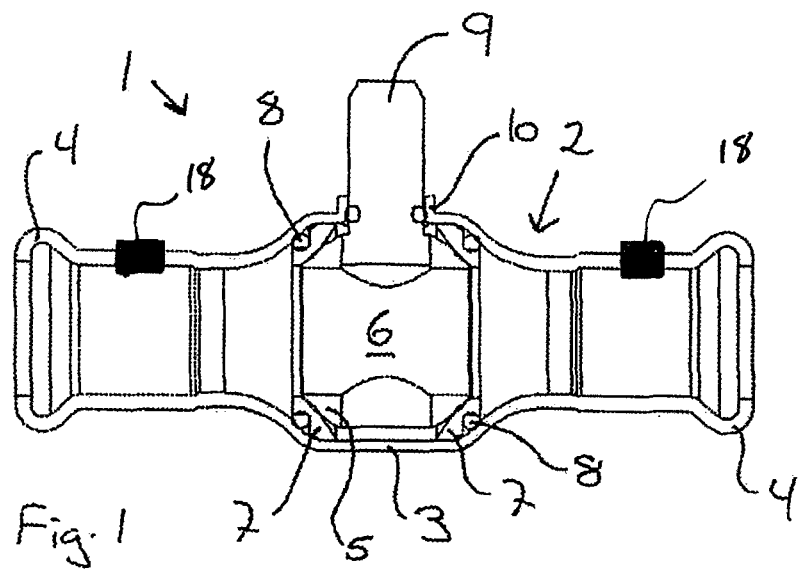
FIG. 1 is a sectional view of a complete valve.

In FIG. 1 appears a valve 1 with a valve housing 2 where the valve housing 2 has a central part 3 and two connection ends 4. The two connection ends 4 are here shown with a design adapted as so-called press-fittings. However, this is irrelevant to the invention and only an example of how these connection ends 4 can be made. In the central part 4 is arranged a valve body 5 with a through-going aperture 6, provided in a valve seat 7 which is sealed by two packings 8 at the inner side in the central part 3. From the valve body 5 which is here constituted by a traditional ball known from various ball valves a valve spindle 9 extends up through a spindle guide stub 10. By turning this valve spindle 9 about its longitudinal axis, the valve body 5 can be moved between an open position as shown and a closed position.

Figure 2:
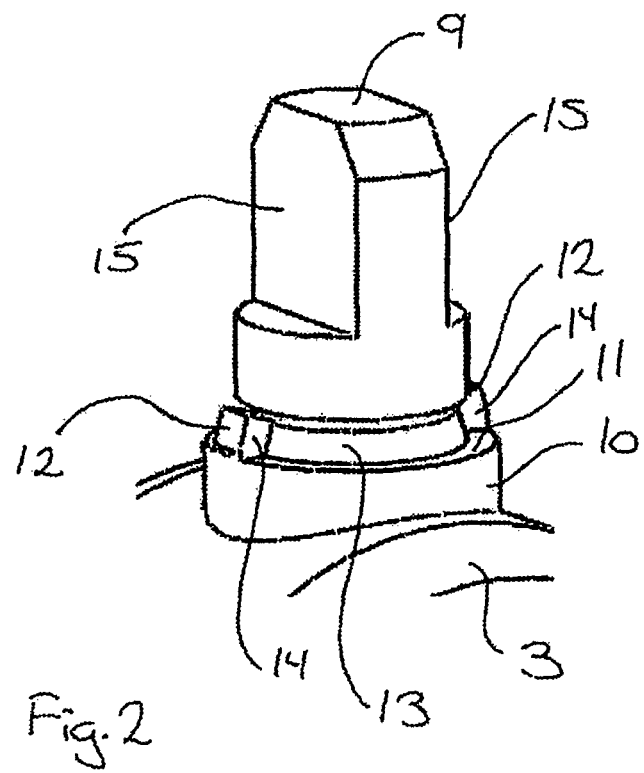
FIG. 2 shows details of a valve spindle in a collared valve guide stub.

FIG. 2 shows a detail of a valve 1. The detail shows in particular the valve spindle 9 arranged in a spindle guide stub 10 which includes two upwardly facing projections 12 at the end 11. These projections 12 are formed during collaring of the spindle guide stub 10, and here they serve the purpose of locking the valve spindle 9 at the intended position as the projections are brought to engage an annular recess 13 on the valve spindle. Contact faces 14 are provided at the sides of the projections 12, serving as abutments/stops against corresponding contact faces, either in the recess 13 or on a not shown handle. Such a handle can advantageously be mounted on the valve spindle 9 and brought to engage the side faces 15 at the end of the valve spindle.

In the illustrated embodiment, the projections 12 are bent into the recess 13, which can be done after, or alternatively before, mounting the valve spindle 9. By forming the bend of the projections 12 before mounting the valve spindle 9, the projections 12 will act resiliently and thus "click" into position in the recess when the recess is opposite the projections.

Figure 3:
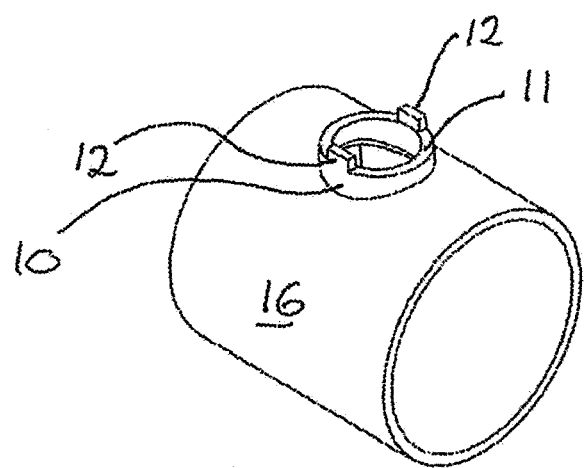
FIG. 3 shows a collared valve guide stub with two projections.

In FIG. 3, a tubular item 16 is shown that has a collared spindle guide stub 10 with two projections 12 on the surface forming the end 11 of the spindle guide stub 10. Here, the two projections 12 are designed with a rectangular shape and are arranged opposite each other.

Figure 4:
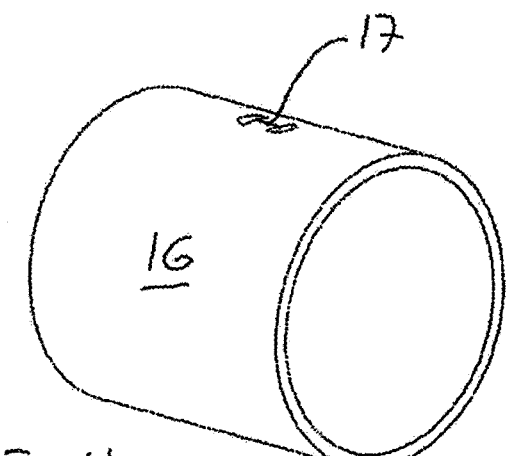
FIG. 4 shows a tube piece as seen in FIG. 3 with a cutout prior to collaring.

FIG. 4 shows the same tubular item 16 as seen in FIG. 3, but here the cutout 17 has been made in the tubular item 16 before collaring through.

Figure 5:
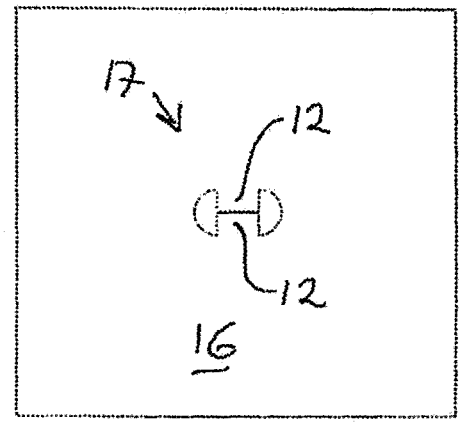
FIG. 5 shows the cutout of FIG. 4 as seen from above.

FIG. 5 shows the same tubular item 16 as in FIG. 4, but here seen directly from above where the cutout 17 with the two projections 12 facing each other and thus extending into the cutout 17 is clearly shown.

Figure 6:
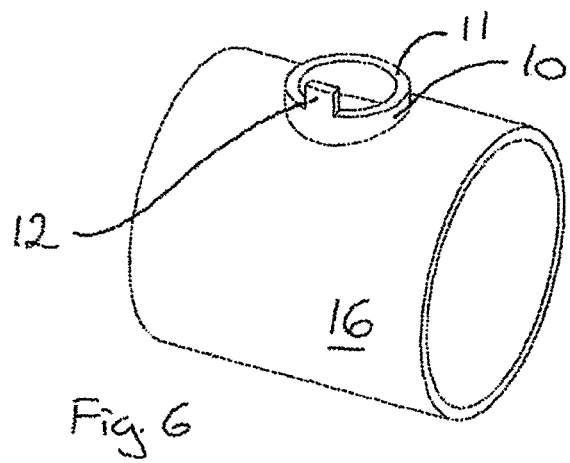
FIG. 6 shows a collared valve guide stub with a projection.

In FIG. 6, a tubular item 16 is shown that has a collared spindle guide stub 10 with only one projection 12 on the surface forming the end 11 of the spindle guide stub 10. The only projection 12, in this case, is designed with a rectangular shape extending in the longitudinal direction of the spindle guide stub.

Figure 7:
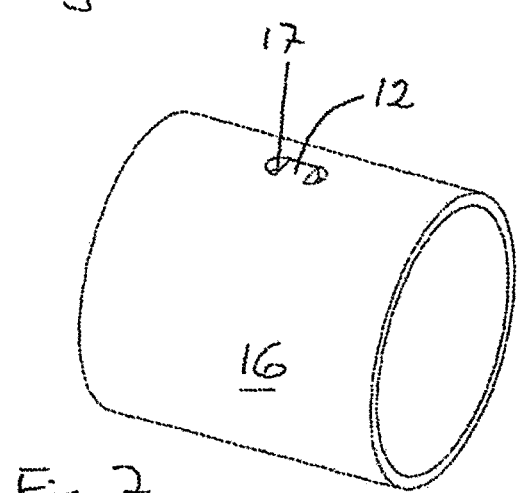
FIG. 7 shows a tube piece as seen in FIG. 6 with a cutout prior to collaring.

FIG. 7 shows the same tubular item 16 as shown in FIG. 6, but here before collaring through the cutout 17 made in the tubular item 16.

Figure 8:
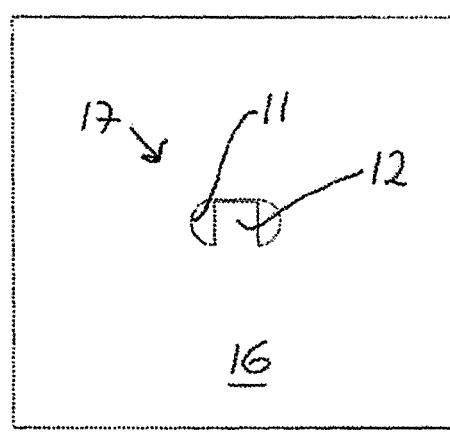
FIG. 8 shows the cutout of FIG. 7 as seen from above.

FIG. 8 shows the same tubular item 16 as in FIG. 7, but here seen directly from above where the cutout 17 with the one projection 12 extending into the cutout 17 is clearly shown.

Figure 9:
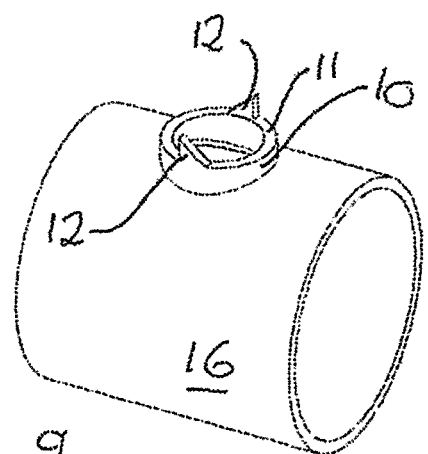
FIG. 9 shows a collared valve guide stub with two projections.

In FIG. 9, a tubular item 16 is shown that has a collared spindle guide stub 10 with two projections 12 on the surface forming the end 11 of the spindle guide stub 10. The two projections 12 are designed with a triangular shape and are arranged opposite each other.

Figure 10:
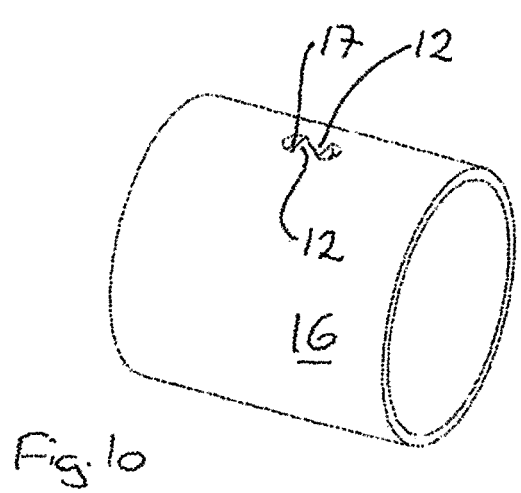
FIG. 10 shows a tube piece as seen in FIG. 9 with a cutout prior to collaring.

FIG. 10 shows the same tubular item 16 as seen in FIG. 9, but here before collaring through the cutout 17 made in the tubular item 16.

Figure 11:
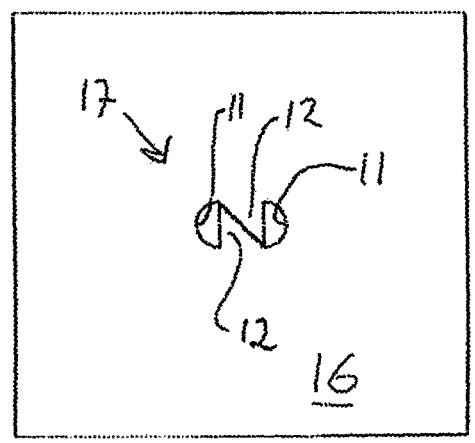
FIG. 11 shows the cutout of FIG. 10 as seen from above.

FIG. 11 shows the same tubular item 16 as in FIG. 10, but here seen directly from above where the cutout 17 with the two triangular projections 12 facing each other and thus extending into the cutout are clearly shown.

The invention is not limited to the above described embodiments and not to the embodiments shown in the drawings either, but may be supplemented and modified in any way according to the invention as will be apparent to those of ordinary skill in the art.

What is claimed is:

1. A method for producing a valve for regulating a fluid, the valve including a valve housing with a central part and with two connection ends, the connection ends extending away from the central part, wherein internally of the central part there is arranged a valve body, with a through-going aperture, arranged in a valve seat and connected to a valve spindle, the valve spindle arranged in a spindle guide stub on the valve housing, wherein the spindle guide stub extends radially outwardly on the valve housing, and wherein the valve housing is at least partly constituted by a plastically deformed item, and wherein the method of producing the valve housing with the outwardly extending spindle guide stub at least includes the following steps:
   providing a tubular item;
   forming a cutout with an internal edge on the tubular item and at least one projection extending into the cutout;
   forming a collar by plastically deforming the cutout, whereby a spindle guide stub is formed by the deforming of the edge of the cutout giving the edge a shape in which the end of the spindle guide stub faces in a direction outwardly away from an interior space of the valve housing; and
   fixing the valve spindle in the spindle guide stub by means of the at least one projection at an end of the spindle guide stub being brought to resiliently engage in a groove on the valve spindle.

2. Method for producing a valve according to claim 1, wherein the tubular item is provided by deep drawing.

3. Method for producing a valve according to claim 1, wherein the tubular item is provided by shortening a prefabricated tube piece with the desired dimensions.

4. A method for producing a valve according to claim 1, wherein the valve spindle is mounted from the outer side of the valve housing and down through the collared spindle guide stub.

5. A method for producing a valve according claim 1, wherein the valve spindle is mounted from the inner side of the valve housing and up through the collared spindle guide stub.

6. A method for producing a valve according to claim 1, wherein the valve body in a valve housing is placed in open position after which the valve is finished by electroplating.

7. Method for producing a valve according to claim 1, wherein the tubular item is provided by a process where a plate piece is worked by deformation into having a generally tubular shape.

8. A valve for regulating a fluid, the valve including a valve housing with a central part and with two connection ends, the connection ends extending away from the central part, wherein a valve body is arranged internally of the central part with a through-going aperture, wherein the valve body is arranged in a valve seat and is connected to a valve spindle, the valve spindle being arranged in a spindle guide stub on the valve housing, and where the spindle guide stub extends radially outwardly on the valve housing, and wherein the valve housing is made from a plastically deformed tubular item and includes the spindle guide stub, wherein the spindle guide stub has a collar that includes at least one projection that extends in continuation of the spindle guide stub, wherein the spindle guide stub and the at least one projection extend in a direction away from the through-going aperture in the valve housing, and wherein the valve spindle is fixed in the spindle guide stub by the at least one projection at an end of the spindle guide stub being in engagement with a groove in the valve spindle.

9. Valve including a valve housing according to claim 8, wherein the valve housing includes an additional collared stub for mounting a sensor.

10. Valve including a valve housing according to claim 8, wherein the at least one projection includes at least one contact face arranged for contacting one or more corresponding contact faces at an operating handle for the valve.

* * * * *